United States Patent [19]

Dennhoven et al.

[11] Patent Number: 4,980,548

[45] Date of Patent: Dec. 25, 1990

[54] DIGITAL POSITION SENSOR FOR INDICATING THE RELATIVE POSITION OF RELATIVELY MOVABLE PARTS

[75] Inventors: Manfred Dennhoven, Wiesbaden; Frank Fichtner, Uelversheim; Mario Gauer, Voelklingen; Enno Holzenkaempfer, Taunusstein; Ulrich Traupe, Wiesbaden, all of Fed. Rep. of Germany

[73] Assignee: Heimann GmbH, Fed. Rep. of Germany

[21] Appl. No.: 411,735

[22] Filed: Sep. 25, 1989

[30] Foreign Application Priority Data

Oct. 26, 1988 [EP] European Pat. Off. ........ 88117857.8

[51] Int. Cl.⁵ .............................................. G01D 5/34
[52] U.S. Cl. ......................... 250/231.16; 250/231.18; 341/13
[58] Field of Search ............ 250/203 R, 211 K, 211 J, 250/231 SE, 237 G, 231.16, 231.18; 341/13

[56] References Cited

U.S. PATENT DOCUMENTS 3,521,271 7/1970 Rappaport .
4,412,206 10/1983 Schwefel ...................... 250/231 SE
4,445,110 4/1984 Breslow ........................ 250/231 SE
4,496,835 1/1985 Boella et al. ................... 250/231 SE
4,521,875 6/1985 Harrington ................... 250/231 SE
4,524,347 6/1985 Rogers .......................... 250/231 SE
4,556,816 12/1985 Imamura et al. .

FOREIGN PATENT DOCUMENTS 0092293 10/1983 European Pat. Off. .
57-176026 10/1982 Japan .

Primary Examiner—David C. Nelms
Assistant Examiner—Stephone B. Allen
Attorney, Agent, or Firm—Hill, Van Santen, Steadman & Simpson

[57] ABSTRACT

A position sensor for supplying digital signals corresponding to the position of a movable part in non-contacting, reliable fashion. A number of individual electrodes are applied on a substrate with a layer of a-Si:H applied thereon. A common, large-area collector electrode is applied over the a-Si:H layer. A light beam is moved over the collector electrode to activate a predetermined combination of photosensitive pixels which may be photodiodes or photoresistors. These pixels are situated between the individual electrodes and the common collector electrode. The output signals of the photodiodes are in the form of a digital code that characterizes the location of the light beam.

5 Claims, 2 Drawing Sheets

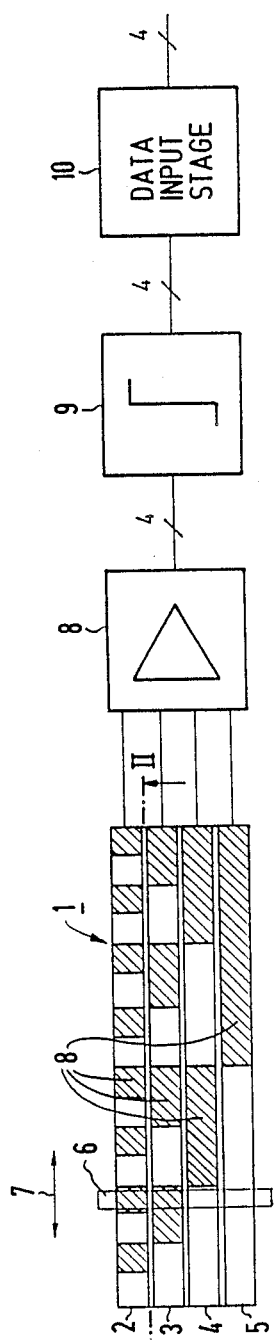
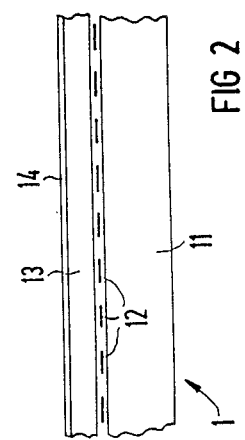
FIG 1
FIG 2

DIGITAL POSITION SENSOR FOR INDICATING THE RELATIVE POSITION OF RELATIVELY MOVABLE PARTS

BACKGROUND OF THE INVENTION

1. Field of the Invention

The invention relates to a sensor for determining the position of a moving part in an apparatus.

2. Description of the Prior Art

For determining the position of a moving part in an apparatus, it is known to couple a potentiometer to this part and to receive an analog electrical signal that corresponds to its various positions. A rubbing contact is often used for coupling, however, this is susceptible to degradation in quality over time. This decrease in contact quality increases the transmission of noise signals in the sensor. Such noise signals lower the accuracy of known position sensors.

SUMMARY OF THE INVENTION

An object of the invention is to provide a digital position sensor that is free of a rubbing contact and having an output signal in digital form, so that it is protected against any clock or noise signals.

The above object is achieved in a digital position sensor constructed in accordance with the principles of the present invention. A number of individual electrodes are formed on a supporting substrate in a digital code pattern, such as a Gray code. An amorphous layer is formed on the electrode pattern. A common collector is applied onto the amorphous layer to form a photodiode arrangement. Each individual electrode and the common collector form a separate photodiode. A light beam activates a combination of photodiodes to generate an output signal in digital code. Each code represents a different location of the light beam. As a result, the location of the light beam can be accurately sensed.

In the digital position sensor of the invention, the position of a movable part is sensed without coupling the moving part to a potentionmeter. The invention is contact-free and senses moving parts via a moving light beam. The position signal is present in digital code and can be directly inputted into a computer for further processing. Due to a special arrangement of the pixels that generate the digital code, an improvement of the resolution is electronically achieved by improving the signal-to-noise ratio.

DESCRIPTION OF THE DRAWINGS

FIG. 1 is a schematic block diagram of a digital position sensor constructed in accordance with the principles of the present invention;

FIG. 2 is a cross-sectional view along the line II—II in FIG. 1;

DETAILED DESCRIPTION OF THE PREFERRED EMBODIMENTS

Figure 3:
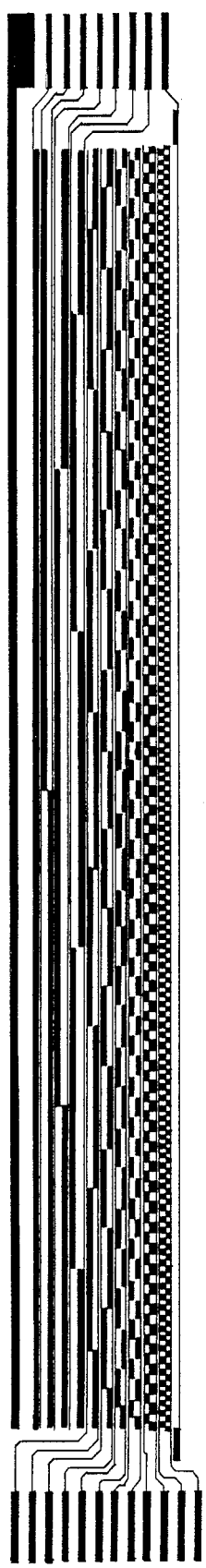
FIG. 3 is a photo mask for producing a position sensor of the invention.

FIG. 1 shows a 4-bit coded photodiode arrangement 1 of a-Si:H that is doped and includes four parallel rows of photodiodes 2, 3, 4, 5. Each row has diodes of a different length and every diode in a given row is the same length. The photodiodes are shown as shaded regions 8. A light beam 6 is movable in the direction of double arrow 7 over the photodiode arrangement 1. The output signals of the photodiodes of the photodiode arrangement 1 are supplied to a data input stage 10, for further processing, via pre-amplifier 8 and a comparator 9.

Figure 4C:
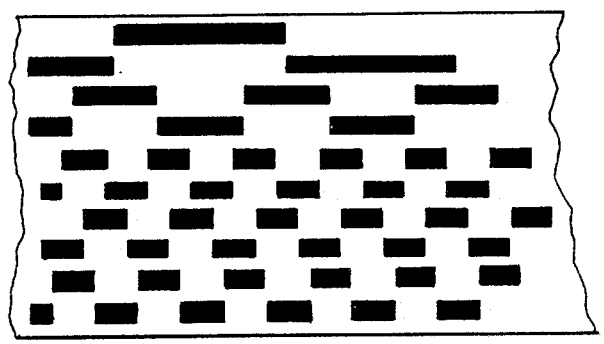
FIGS. 4a through 4c show various codes for a digital position sensor of the invention.
Figure 4B:
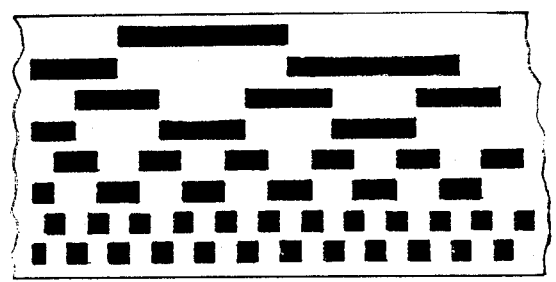
Figure 4A:
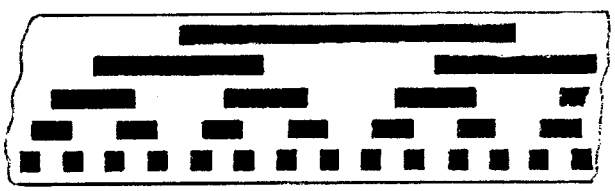

The arrangement of the individual photodiodes of the photodiode arrangement 1 is selected according to a predetermined code, for example a gray code as in FIG. 4a, that can also be modified or based on some other code that may potentially yield higher resolution. In the arrangement of FIG. 1 with light beam 6 situated as shown, the output signal is "1100". Predetermined step-by-step movement of the light beam 6 yields an individual combination of output signals where each step corresponds to an output signal. This individual combination represents information regarding the location of the light beam 6.

In FIG. 2, the photodiode arrangement 1 is designed as a large-area sensor that includes a plurality of individual electrodes 12 on a substrate 11 corresponding to the photodiode rows 2 through 5 in FIG. 1. The individual electrodes 12 can, for example, be formed by a structured titanium layer that is vapor-deposited on the substrate 11 in accordance with the selected code.

A a-Si:H layer 13 is applied onto the individual electrodes 12 and a common, large-area collector electrode 14, of a material such as ITO or SnO, is applied over this layer 13. A photodiode is formed between the collector electrode 14 and each one of the individual electrodes 12. The photodiodes are activated by light according to the position of light beam 6.

FIG. 3 shows a photo mask for manufacturing a photodiode arrangement corresponding to the photodiode arrangement 1 in FIG. 1, including a modified code that, given a width of 9 bits and the selected line length, a resolution of 0.1 mm can be realized. This arrangement makes it possible to employ an unstructured a-Si:H layer.

FIG. 4b shows the complementary arrangement compared to the normal Gray code of FIG. 4a. By improving the signal-to-noise ratio, the electronic evaluation will improve the resolution. FIG. 4c shows a further modification, with smaller pixels, that allows for a further enhancement of resolution.

Alternatively, an incremental arrangement, having longitudinal position resolution shown in FIG. 1, can be realized in a corresponding arrangement according to the principles of the present invention.

Although modifications and changes may be suggested by those skilled in the art, it is the intention of the inventors to embody within the patent warranted hereon, all changes and modifications as reasonably and properly come within the contribution to the art.

We claim as our invention:

1. A digital position sensor for indicating the position of a movable part, comprising:
    a substrate disposed on a first part;
    a plurality of discrete electrodes forming a pattern on said substrate;
    an amorphous layer covering said discrete electrodes;
    a common collector layer covering said amorphous layer, said common collector layer in combination with each of said discrete electrodes and the amorphous layer therebetween forming a pattern of discrete photodiodes in registry with said discrete electrodes;

means disposed on a second part for emitting a light beam of selected size which is incident on a combination of photodiodes in said pattern of discrete photodiodes thereby causing said combination of discrete photodiodes on which said light beam is incident to generate a digital output signal, said first and second parts being relatively movable; and said pattern of discrete photodiodes and said size of said light beam in combination defining a unique digital output signal for each combination of discrete photodiodes which identifies the relative position of said first and second parts.

2. A digital position sensor as claimed in claim 1, wherein said plurality of individual electrodes form photosensitive pixels in a Gray code pattern.

3. A digital position sensor as claimed in claim 1, wherein said plurality of individual electrodes form photosensitive pixels in a complementary pattern.

4. A digital position sensor as claimed in claim 1, wherein said amorphous layer consists of a-Si:H material.

5. A digital position sensor as claimed in claim 1, wherein said second electrode layer consists of a material selected from the group consisting of ITO and SnO.

* * * * *